(12) United States Patent
Imaeda et al.

(10) Patent No.: US 9,527,433 B2
(45) Date of Patent: Dec. 27, 2016

(54) CONTROL APPARATUS FOR CONTROLLING LIGHT EMISSION OF VEHICLE HEADLIGHT, AND HEADLIGHT SYSTEM PROVIDED WITH THE CONTROL APPARATUS

(71) Applicant: DENSO CORPORATION, Kariya, Aichi-pref. (JP)

(72) Inventors: Koji Imaeda, Inazawa (JP); Yoshikazu Hatada, Chiryu (JP)

(73) Assignee: DENSO CORPORATION, Kariya, Aichi-pref.

( * ) Notice: Subject to any disclaimer, the term of this patent is extended or adjusted under 35 U.S.C. 154(b) by 0 days.

(21) Appl. No.: 14/775,596

(22) PCT Filed: Mar. 12, 2014

(86) PCT No.: PCT/JP2014/056541
§ 371 (c)(1),
(2) Date: Sep. 11, 2015

(87) PCT Pub. No.: WO2014/142188
PCT Pub. Date: Sep. 18, 2014

(65) Prior Publication Data
US 2016/0023591 A1 Jan. 28, 2016

(30) Foreign Application Priority Data
Mar. 12, 2013 (JP) ................ 2013-049309

(51) Int. Cl.
*B60Q 1/02* (2006.01)
*B60Q 1/14* (2006.01)

(52) U.S. Cl.
CPC ....... *B60Q 1/1423* (2013.01); *B60Q 2300/056* (2013.01); *B60Q 2300/322* (2013.01); *B60Q 2300/42* (2013.01)

(58) Field of Classification Search
None
See application file for complete search history.

(56) References Cited

U.S. PATENT DOCUMENTS

2004/0016870 A1* 1/2004 Pawlicki ............ G08G 1/167
250/208.1

FOREIGN PATENT DOCUMENTS

JP    2008-296759 A    12/2008
JP    2008296759 A  *  12/2008
(Continued)

OTHER PUBLICATIONS

International Preliminary Report on Patentability; International Application No. PCT/JP2014/056541; Filed: Mar. 12, 2014 (with English translation).
(Continued)

*Primary Examiner* — Douglas W Owens
*Assistant Examiner* — Dedei K Hammond
(74) *Attorney, Agent, or Firm* — Knobbe, Martens, Olson & Bear, LLP (57) ABSTRACT

A control apparatus, which controls a headlight unit, repeatedly performs a process of measuring brightness ahead of the own vehicle using a luminance sensor. For example, when a curved road region is present ahead of the own vehicle, measurement is made of the brightness of a road surface or a guardrail of a specified region (region to which light from a headlight unit of a forward vehicle is emitted) in the road region. Then, a variation (Δ) in a measurement value of the brightness from a previous measurement value is calculated. When the variation (Δ) is equal to or more than a threshold TH, a vehicle yet to emerge is predicted to emerge in a forward view of the own vehicle to thereby
(Continued)

switch a lighting mode for the light emitted from the headlight unit to another mode so that the emergence area is darkened.

16 Claims, 8 Drawing Sheets

(56) References Cited

FOREIGN PATENT DOCUMENTS

| JP | 2009-096249 A | 5/2009 |
| JP | 2011-037342 A | 2/2011 |
| JP | 2013-209034 A | 10/2013 |
| WO | 2014/142188 A1 | 9/2014 |

OTHER PUBLICATIONS

International Search Report (translated version); International Application No. PCT/JP2014/056541, filed Mar. 12, 2014; 11 pages.

* cited by examiner

CONTROL APPARATUS FOR CONTROLLING LIGHT EMISSION OF VEHICLE HEADLIGHT, AND HEADLIGHT SYSTEM PROVIDED WITH THE CONTROL APPARATUS

CROSS-REFERENCE TO RELATED APPLICATION

This application is based on and claims the benefit of priority from earlier Japanese Patent Application No. 2013-049309 filed Mar. 12, 2013, the description of which is incorporated herein by reference.

BACKGROUND

Technical Field

The present invention relates to a control apparatus for controlling light emission of a vehicle headlight, and a headlight system provided with the control apparatus.

Technical Background

A headlight unit mounted to a vehicle emits light with its conditions being controlled by a control apparatus which is conventionally well known. The emission control is performed on the basis of various pieces of information.

For example, there is known a control apparatus that controls light emission conditions of a headlight unit on the basis of the state of approach of an oncoming vehicle or the ambient brightness. In another control apparatus which is also well known, a road shape is recognized from an image captured by a camera, and the recognized road shape is used for estimating a region where an oncoming vehicle could be present. Then, the estimation results are used as bases for performing the emission control (e.g., see PTL 1). According to this control apparatus, the approach of an oncoming vehicle in the estimated region is detected using a millimeter-wave radar apparatus. Then, on condition that the detection has been conducted, light emission is controlled to ensure that light is not emitted to the corresponding region.

CITATION LIST

Patent Literature

[PTL 1] JP-A-2009-096249

Technical Problem

As mentioned above, according to the conventional apparatus of either of the examples, the light emitted from a headlight unit is controlled when a vehicle is detected in a forward direction, so that high-intensity light is prevented from being emitted to the forward vehicle.

However, in an environment of poor visibility in an advancement direction, a forward vehicle cannot be promptly detected. Therefore, in an environment where only poor visibility is ensured, such a conventional apparatus suffers from a problem of dazzling an occupant of a forward vehicle by the time of completing the above control based on the detection of a forward vehicle.

SUMMARY

The present invention has been made in light of such a problem and has as its object to timely control the light emission of a headlight unit in an environment of poor visibility to prevent or reduce dazzling of an occupant of another vehicle emerging in a forward direction.

A light control apparatus related to the present disclosure is an apparatus that controls a headlight unit mounted to a vehicle, and includes a measuring means, a predicting means, and a control means. The measuring means measures brightness ahead of a vehicle. The predicting means predicts whether or not another vehicle emerges ahead of the vehicle, on the basis of a variation in the brightness of a specified region ahead of the vehicle measured by the measuring means. The control means controls emission of light from the headlight unit to thereby darken an area where another vehicle will emerge, when the predicting means predicts emergence of another vehicle.

In an environment where the headlight of a vehicle is lit, it is considered that the headlight unit of another vehicle that is present near the vehicle is also lit. Accordingly, when another vehicle that moves and approaches the own vehicle is concerned, the region illuminated by the light from the headlight unit of another vehicle emerges precedential to the emergence of another vehicle. The headlight control apparatus measures the brightness ahead of the own vehicle to observe such phenomenon and predict emergence of another vehicle.

According to the present disclosure, emergence of a forward vehicle is predicted prior to the emergence thereof to thereby control emission of light from the headlight unit. Accordingly, on condition that a forward vehicle has been detected, a probability is minimized of dazzling an occupant of the forward vehicle by the light emission of the own vehicle. The minimization is more than that achieved in the conventional apparatus for controlling emission of light from a headlight unit. Thus, a headlight control apparatus superior to conventional one can be configured.

Specifically, the headlight control apparatus can be configured to predict whether or not another vehicle emerges, on the basis of the variation of brightness in a specified region near a curved road region, in an environment where the curved road region is present ahead of the vehicle.

Specifically, the headlight control apparatus can be configured to include a curve determining means that determines whether or not a curved road region is present ahead of the vehicle. The predicting means can be configured to predict whether or not another vehicle emerges, on the basis of the variation in the brightness measured by the measuring means in a specified region near a curved road region, when the curved road region is predicted to be present.

When a curved road is present ahead of the vehicle, the own vehicle may unavoidably approach another vehicle prior to the emergence of another vehicle. In such a case, the headlight control apparatus is able to prevent an occupant of another vehicle from being dazzled by appropriately controlling emission of light from the headlight unit.

DESCRIPTION OF EMBODIMENTS

With reference to the drawings, hereinafter is described an embodiment of the present invention.

Figure 1:
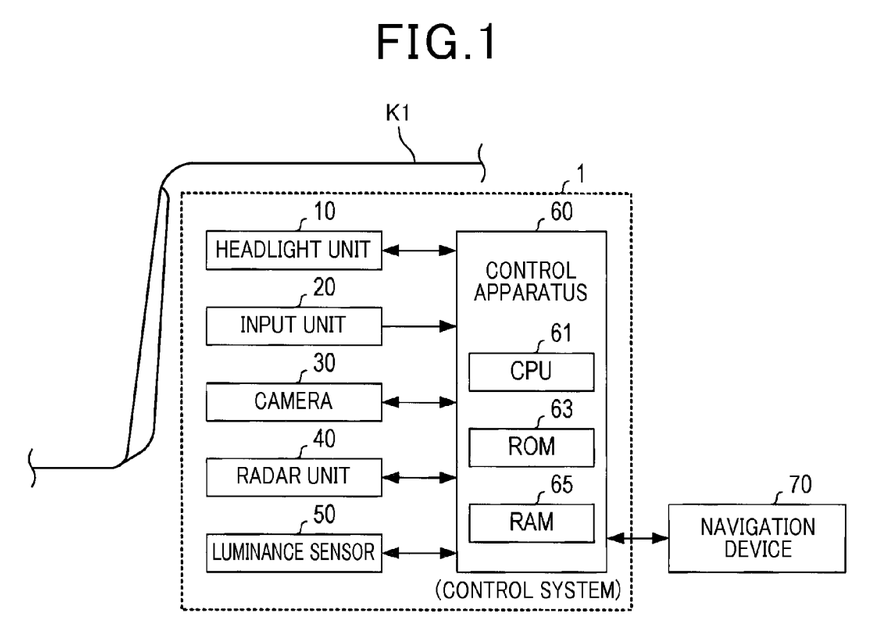
FIG. 1 is a block diagram illustrating a configuration of a control system of the present embodiment.

FIG. 1 shows a control system 1 of the present embodiment. The control system 1 is mounted to a vehicle (e.g., four-wheel vehicle) K1 to control the light emitted from a headlight unit 10 which is provided to a front end portion of the vehicle. The control system 1 includes the headlight unit 10, an input unit 20, a camera 30, a radar unit 40, a luminance sensor 50 and a control apparatus 60.

The headlight unit 10 brightly illuminates ahead of the vehicle, as known, to ensure a driver's field of view ahead of the vehicle. The headlight unit 10 is controlled by the control apparatus 60 to turn on/off the light and, further, switch lighting directions (in other words, illumination ranges).

Specifically, the headlight unit 10 has a plurality of lighting modes with different lighting directions. The plurality of lighting modes include a high-beam mode, a low-beam mode and a middle-beam mode.

As well known, a high-beam mode is used for emitting light over a long distance. The lighting direction in the high-beam mode has a large elevation angle. Relying on the high-beam mode, a road region over a long distance can be brightly illuminated with the large elevation angle.

However, in the high-beam mode of emitting light with a large elevation angle, high-intensity light is likely to be emitted and dazzle an occupant of a forward vehicle K2. For this reason, in general, a high-beam mode is not used in a heavily-trafficked area (e.g., urban area) but is used in a lightly-trafficked area (e.g., mountain area or expressway).

Figure 2:
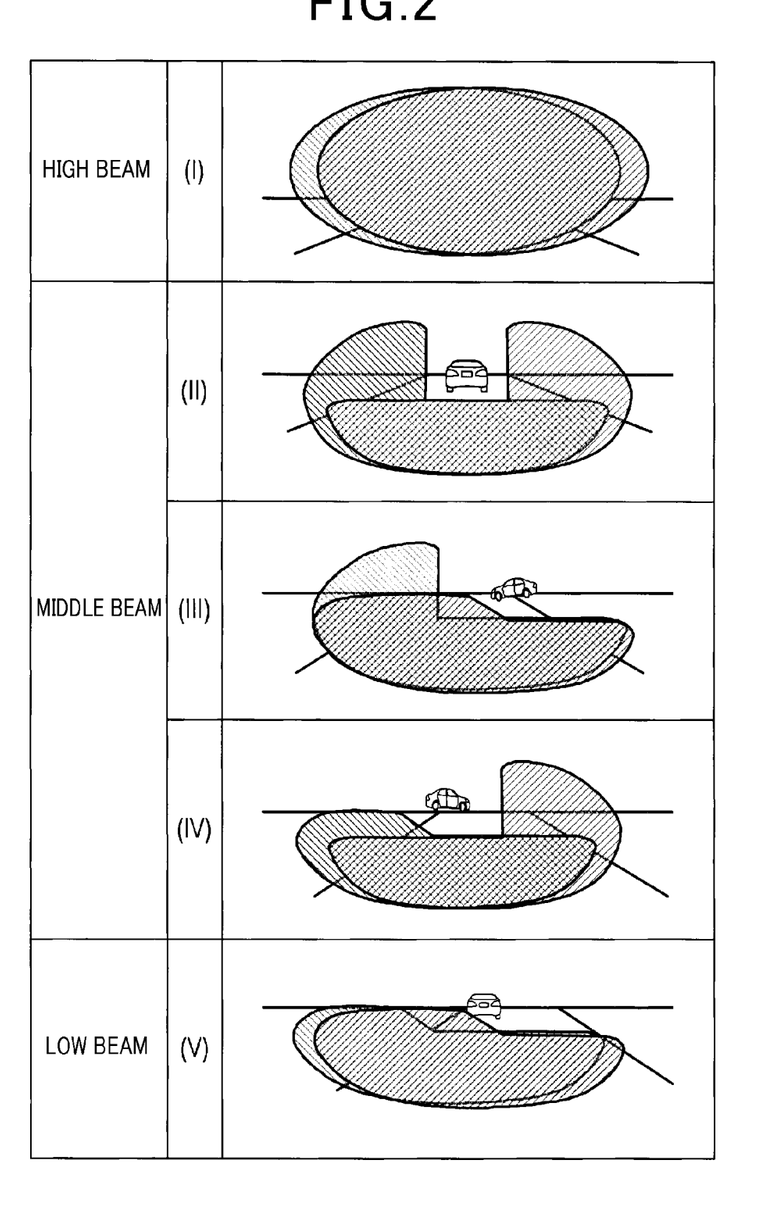
FIG. 2 is a list of lighting modes provided to a headlight unit.

Hereinafter, the high-beam mode is also referred to as a first lighting mode which is indicated by a sign (I) in the drawings. The pair of hatched regions of the uppermost diagram shown in FIG. 2 indicates illumination ranges of the first lighting mode. Similar to know headlight units, the headlight unit 10 is provided with lighting devices on the right and the left of the front end portion of the vehicle. In FIG. 2, the pair of partially overlapped hatched regions indicate the respective illumination ranges of the right and left lighting devices.

As well known, in a low-beam mode, light is emitted with a small elevation angle compared to a high-beam mode to emit light over a short distance, not a long distance, of a road region.

Of the plurality of lighting modes of the headlight unit 10, the low-beam mode is most unlikely to dazzle the occupant of the forward vehicle K2 and thus is used quite frequently in a heavily-trafficked area. Hereinafter, the low-beam mode is also referred to as a fifth lighting mode which is indicated by a sigh (V) in the drawings. The pair of hatched regions of the lowermost diagram shown in FIG. 2 indicates illumination ranges of the fifth lighting mode.

The middle-beam mode has mixed features of the high- and low-beam modes. The headlight unit 10 of the present embodiment has three types of middle-beam modes. When the region ahead of the own vehicle is divided into three sections, i.e. left, center and right sections, features of the high- and low-beams are mixed in these respective sections.

With one of the middle-beam modes, light is emitted to the hatched regions shown in the second diagram of FIG. 2. Hereinafter, this lighting mode is also referred to as a second lighting mode which is indicated by a sign (II) in the drawings.

As shown in FIG. 2, in the second lighting mode, light is emitted with a large elevation angle on the right and left sections ahead of the own vehicle to emit light over a long distance similar to the high-beam mode, while light is emitted with a small elevation angle in the center section to ensure that the light is not emitted over a long distance similar to the low-beam mode. For example, the second lighting mode is used in an environment where there are no vehicles on the right- and left-forward directions of the own vehicle K1.

With one of the middle-beam modes, light is emitted to the hatched regions shown in the third diagram of FIG. 2. Hereinafter, this lighting mode is also referred to as a third lighting mode which is indicated by a sign (III) in the drawings.

In the third lighting mode, light is emitted over a long distance in the left section ahead of the own vehicle similar to the high-beam mode, while light is emitted with a small elevation angle in the center and right sections similar to the low-beam mode. For example, the third lighting mode is used in an environment where there are no vehicles in the right-forward direction of the own vehicle (e.g., region extending over 10 degrees or more on the right ahead of the own vehicle).

With one of the middle-beam modes, light is emitted to the hatched regions shown in the fourth diagram of FIG. 2. Hereinafter, this lighting mode is also referred to as a fourth lighting mode which is indicated by a sigh (IV) in the drawings.

In the fourth lighting mode, light is emitted over a long distance with a large elevation angle in the right section ahead the own vehicle similar to the high-beam mode, while light is emitted with a small elevation angle in the center and left sections similar to the low-beam mode. For example, the fourth lighting mode is used in an environment where there are no vehicles in the left-forward direction of the own vehicle (e.g., region extending over 10 degrees or more on the left ahead of the own vehicle).

The control apparatus 60 switches the lighting modes according to manipulated signals inputted by the driver from the input unit 20, or in conformity with the environment ahead of the own vehicle, the environment being specified by using the camera 30, the radar unit 40 and the like. As well known, the input unit 20 is mounted in front of the driver's seat to receive the driver's manipulation associated with turning on/off of the headlight unit 10 and switching of the lighting modes.

The camera 30 captures an image of a region ahead of the own vehicle. The camera 30 captures an image covering a wide range ahead of the own vehicle, including a region over which light is emitted with the high-beam mode. The camera 30 inputs color image signals expressing the captured image to the control apparatus 60.

The radar unit 40 emits radar waves and receives the reflected waves via an array antenna to measure a distance to a target that is a reflection source of the radar waves, as well as a speed relative to the target and an azimuth of the target. The radar unit 40 then inputs data indicative of the measurement results to the control apparatus 60. For example, the radar unit 40 is configured as a millimeter-wave radar unit.

The luminance sensor 50 captures an image covering a wide range ahead of the own vehicle, the range corresponding the image-capturing range of the camera 30, and detects luminance at each point, as brightness at each point in the image-capturing range. The luminance sensor 50 inputs the detection value of luminance at each point to the control apparatus 60.

On the other hand, the control apparatus 60 receives inputs of signals (data) from the input unit 20, the camera 30, the radar unit 40 and the luminance sensor 50. The control apparatus 60 includes a CPU 61, a ROM 63 and a RAM 65.

The CPU 61 executes a process according to a program stored in the ROM 30 for overall control of the units in the control system 1.

The ROM 63 stores the program, while the RAM 65 is used as a work area where the process is executed by the CPU 61. The following description sets force the process executed by the CPU 61 according to the program. In the following description, the control apparatus 60 is the subject of operation.

Figure 3:
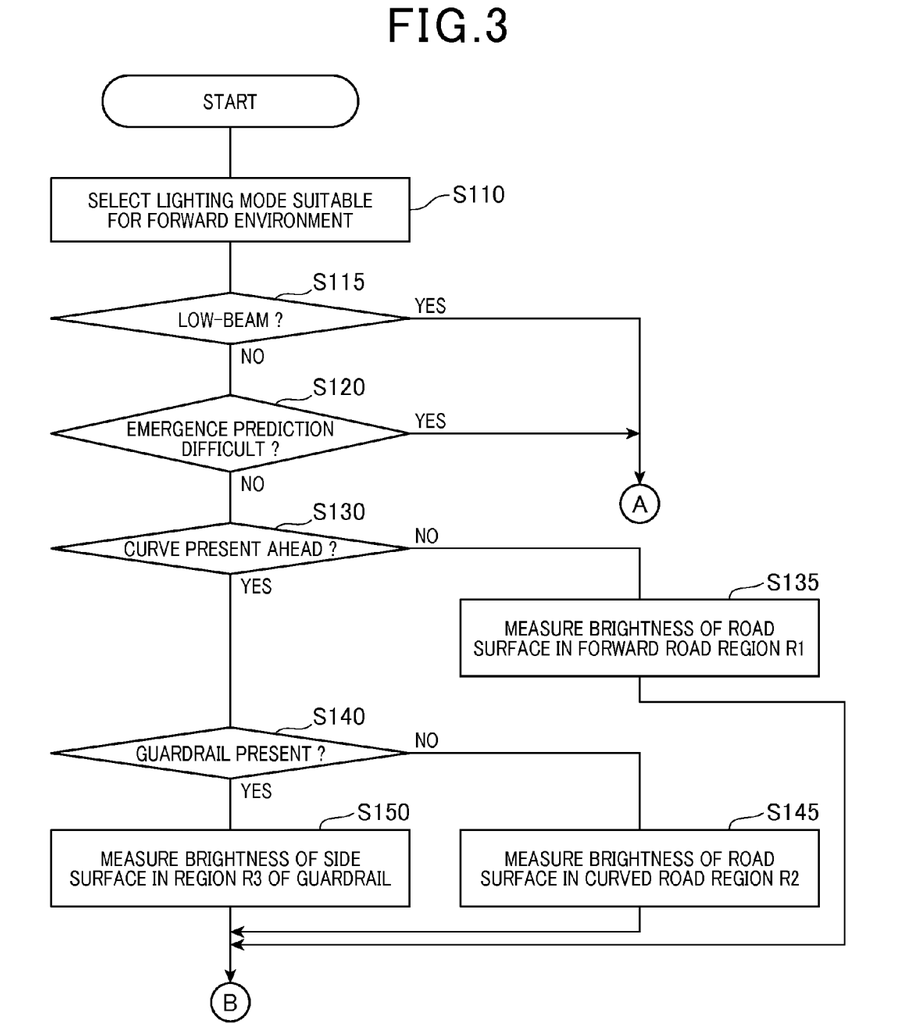
FIG. 3 is a flow chart (first half) illustrating a light distribution control process performed by a control apparatus.
Figure 4:
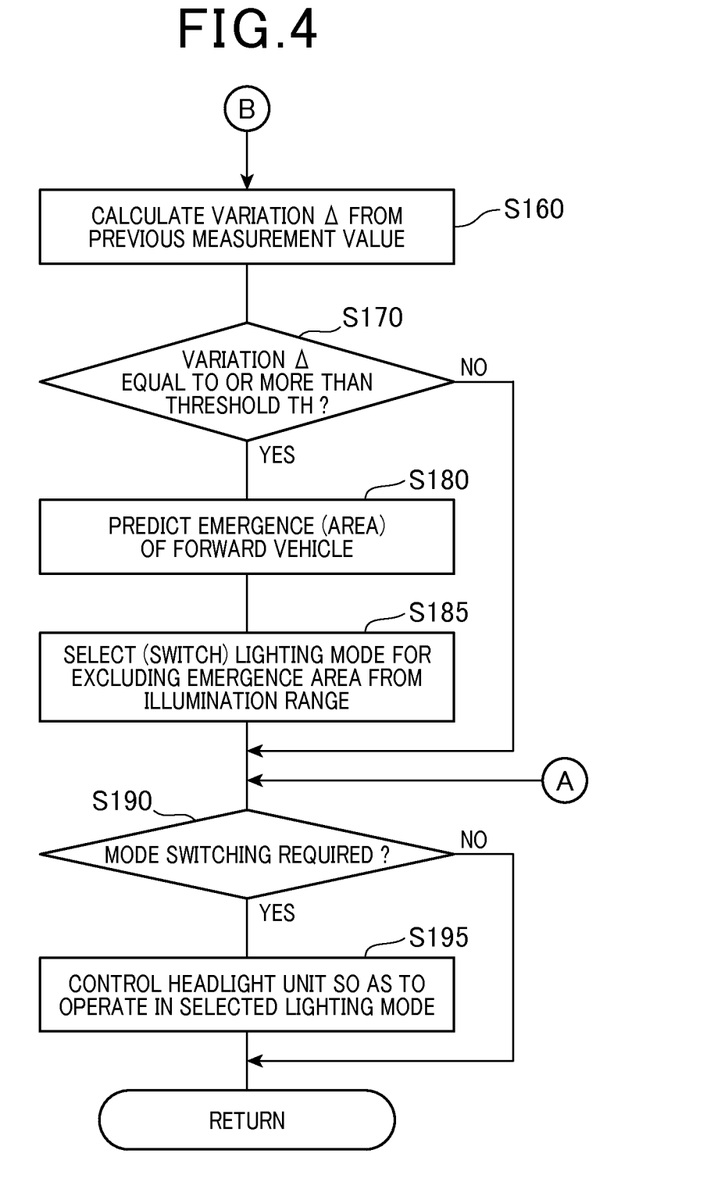
FIG. 4 is a flow chart (second half) illustrating a light distribution control process performed by a control apparatus.

As described above, the control apparatus 60 controls the headlight unit 60 according to manipulated signals inputted from the input unit 20, and achieves turning on/off of the headlight unit 60 and switching of the lighting modes. On the other hand, when an instruction is received from the driver via the input unit 20 to automatically switch the lighting modes, a light distribution control process shown in FIGS. 3 and 4 is repeatedly, at intervals, executed. In describing the process, a sign S indicates a step performed by the control apparatus 60, i.e. the CPU 61.

The light distribution control process is performed based on image signals obtained from the camera 30. The process includes switching of the lighting modes performed on the basis of a positional relationship, as well as switching of the lighting modes performed on the basis of emergence prediction results. The positional relationship is established between a forward object, which is present in a forward view (i.e. image-capturing range of the camera 30), and the own vehicle K1. The emergence prediction results show the results of predicting emergence of the forward vehicle K2, which is not yet present in the forward view, into the forward view.

Once the light distribution control process is started, the control apparatus 60 firstly uses conventional techniques to select a lighting mode which is suitable for the forward environment, as a lighting mode to be set in the lighting unit 10 (S110). Specifically, the control apparatus 60 selects an appropriate lighting mode, as a lighting mode to be set, on the basis of the positional relationship between a forward object that is present in the forward view (image-capturing range of the camera 30) and the own vehicle K1.

At S110, the control apparatus 60 specifies a positional relationship between the forward vehicle and the own vehicle K1 in an image captured by the camera 30, on the basis of image signals derived from the camera 30 and measurement results derived from the radar unit 40. Then, the control apparatus 60 can select a lighting mode, as a lighting mode to be set, with which high-intensity light is not emitted to the forward vehicle.

At S110, the control apparatus 60 may acquire road-attribute or area-attribute information corresponding to the current location from a navigation device 70 (see FIG. 1), which is equipped with a road map and mounted to the own vehicle K1, via a vehicular network. Taking account of this information, the control apparatus 60 may select a lighting mode to be set. For example, in the case where the own vehicle K1 is located in an urban area, the control apparatus 60 may always select the low-beam mode as the lighting mode to be set, and only in other cases, may select a lighting mode on the basis of the positional relationship with the forward vehicle.

After completing the processing at S110, the control apparatus 60 determines whether or not the selected lighting mode to be set is a low-beam mode (S115). If the selected mode is determined to be a low-beam mode (Yes at S115), control proceeds to S190.

At S190, it is determined whether or not the lighting mode of the headlight unit 10 is required to be switched to another mode. If the currently set lighting mode of the headlight unit 10 is different from the lighting mode to be set, the control apparatus 60 (affirmatively) determines that the lighting mode is required to be switched to another mode. Otherwise, the control apparatus 60 (negatively) determines that the lighting mode is not required to be switched to another mode.

If an affirmative determination is made (Yes at S190), control proceeds to S195 where the headlight unit 10 is controlled so as to operate in the lighting mode to be set. In other words, the lighting mode of the headlight unit 10 is switched to the lighting mode to be set. After that, the light distribution control process is halted. Contrarily, if a negative determination is made (No at S190), the control apparatus 60 retains the current lighting mode of the headlight unit 10 and in this state halts the light distribution control process.

At S115, if the lighting mode to be set is determined not to be a low-beam mode (No at S115), the control apparatus 60 allows the process to proceed to S120. At S120, it is determined whether or not the environment ahead of the own vehicle is the one where the emergence prediction of the forward vehicle K2 is difficult to be performed.

Although the details will be described later, according to the present embodiment, in the processing performed on or after S130, the control apparatus 60 detects the region illuminated by the headlight unit of a vehicle whose image has not yet been captured by the camera 30. With this detection, the vehicle in question can be detected before being imaged by the camera 30, thereby predicting the emergence of the vehicle in question in the forward view. When emergence of a vehicle is predicted, the lighting mode is switched to another mode so that high-intensity light is not emitted to an occupant of the vehicle.

However, there may be a situation where the forward view is partially blocked by a preceding vehicle, or the region illuminated by the light of a vehicle, whose emergence is going to be predicted, cannot be accurately detected because the region ahead of the own vehicle is not dark. In such a situation, the emergence of the forward vehicle K2 cannot be detected with sufficiently high accuracy. Therefore, resultantly, the lighting mode cannot be appropriately switched to another mode on the basis of the results of the prediction.

Then, at S120, if the region ahead of the own vehicle is not a predetermined environment where the emergence prediction of the forward vehicle K2 can be conducted with an allowable accuracy, the environment is determined to be one where it is difficult to conduct emergence prediction of the forward vehicle K2 (Yes at S120), and control proceeds to S190. After that, the headlight unit 10 is controlled such that the headlight unit 10 can operate in the lighting mode to be set that has been selected at S110.

On the other hand, when the region ahead of the own vehicle is the predetermined environment, the control apparatus 60 determines that emergence prediction of the forward vehicle K2 can be conducted (No at S120), and control proceeds to S130.

At S130, the control apparatus 60 determines whether or not there is a curved road region in the forward view of the own vehicle K1. For example, this determination can be made by analyzing the image signals derived from the camera 30 and specifying the road shape ahead of the vehicle. This determination can also be made by acquiring the information regarding the road shape ahead of the own vehicle from the navigation device 70.

Figure 5:
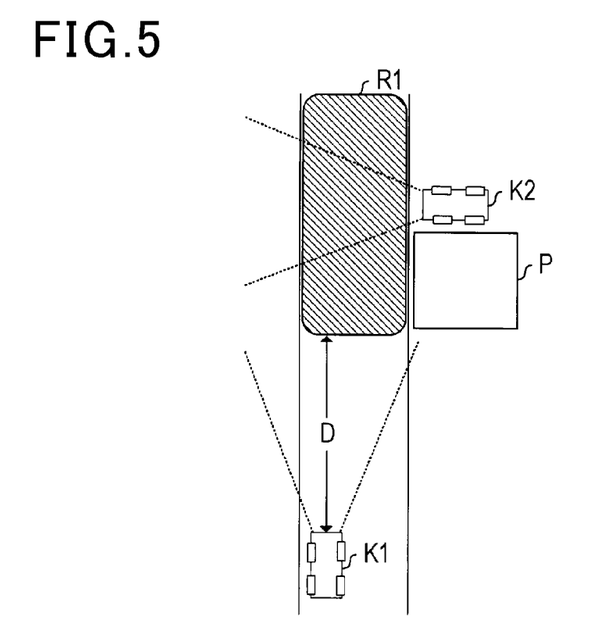
FIG. 5 is a diagram illustrating an example of a region where brightness is measured, when there is no curve ahead of the vehicle.

At S130, if it is determined that there is no curved road region, the control apparatus 60 allows the process to proceed to S135. At S135, measurement is made of the brightness of the road surface in a road region R1 ahead of the own vehicle. FIG. 5 shows, by hatching, an example of the region R1 for which the brightness of the road surface is measured at S135.

For example, at S135, the luminance sensor 50 is permitted to detect a luminance at each of points in a region ahead of the own vehicle to acquire a luminance detection value of each of the points. Then, of the luminance detection values of the respective points, a group of luminance detection values of designated points is extracted and stored as a measurement value M1 of the brightness of the road surface in the region R1. In this case, some points in the group correspond to the road surface in the region R1 specified by the image signals from the camera 30 and the measurement results of the radar unit 40.

As another example, the road surface in the region R1 may be divided into a plurality of blocks, for each of which a total value of the luminance detection values at points included in the block is calculated. Then, a group of total values of the blocks may be stored as the measurement value M1 of the brightness of the road surface of the region R1. The total value may be calculated as an average, a median, a sum or a maximum of the luminance detection values of at respective points in each block.

The region R1 may be determined using a reference point which is away from the own vehicle K1 by a predetermined distance D along the road. Specifically, the region R1 may be determined within a region from such a reference point to a vanishing point of the road in the image captured by the camera 30. The distance D may be determined so that the region R1 is defined as a region where an occupant of the forward vehicle K2 is applied with high-intensity light in a high-beam mode, but the occupant of the forward vehicle K2 is not applied with high-intensity light in a low-beam mode.

After calculating, at S135, the measurement value M1 for the brightness of the road surface in the region R1, the control apparatus 60 allows the process to proceed to S160.

On the other hand, if a curved road region is determined to be present in the forward view (Yes at S130), the control apparatus 60 allows the process to proceed to S140. At S140, the control apparatus 60 determines whether or not a guardrail 80 is located along the curved road region.

The guardrail 80 herein refers to a onefold attachment of road provided along an edge of the road (roadway). Specifically, the guardrail 80 referred to herein includes, for example, well-known guardrails with metal beams of a W-shaped cross section being attached to poles, large-sized wall guardrails built up to a high level, and sound insulation walls. In the present specification when a guardrail is referred to, the guardrail includes these guardrails.

At S140, when it is determined that there is no guardrail 80 being built up, the control apparatus 60 allows the process to proceed to S145. At S145, measurement is made of the brightness of the road surface in a curved road region R2 ahead of the own vehicle.

For example, at S145, similar to S135, the luminance sensor 50 is permitted to detect a luminance at each of points in a region ahead of the own vehicle. Then, of the luminance detection values of the respective points, a group of luminance detection values at some points is extracted and stored as a measurement value M2 of the brightness of the road surface in the region R2. In this case, some points in the group correspond to the road surface in the region R2.

Figure 6:
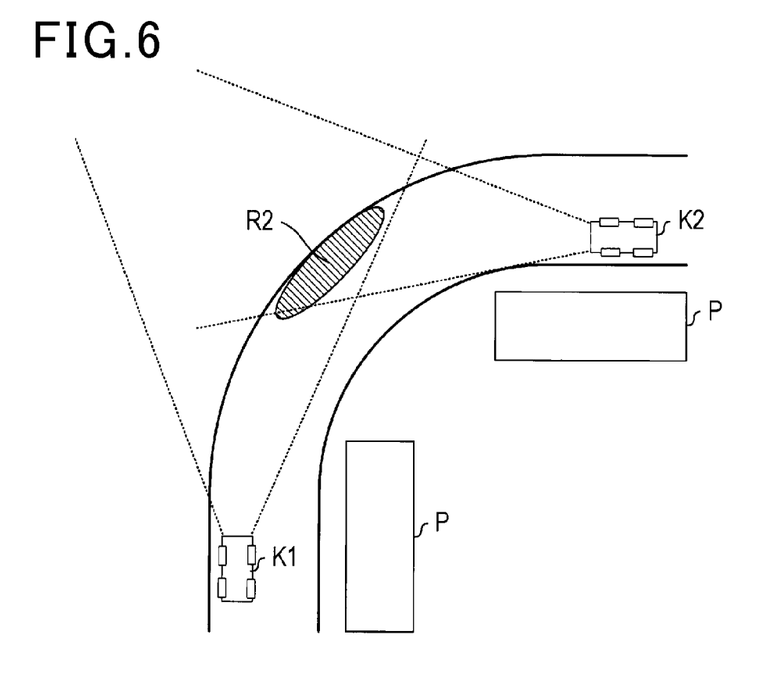
FIG. 6 is a diagram illustrating an example of a region where brightness is measured, when there is a curve ahead of the vehicle with no guardrail being provided.

As another example, the road surface in the region R2 may be divided into a plurality of blocks, for each of which a total value (e.g., average, median, sum or maximum) of the luminance detection values at respective points included in the block is calculated. Then, a group of the total values of the blocks may be stored as the measurement value M2 of the brightness of the road surface in the region R2.

The hatched area of FIG. 6 indicates an example of the region R2 for which the brightness of the road surface is measured. A road region that can be determined to be the region R2 corresponds to a region which is estimated to receive emission of light on the road surface from the headlight unit of an oncoming vehicle. In this case, the oncoming vehicle is present ahead of the curved road region residing in the forward direction of the own vehicle. However, the region R2 is determined such that the road surface therein is included in the forward view of the own vehicle K1, or in other words, the image-capturing range of the camera 30, and the luminance detection range of the luminous sensor 50.

As mentioned above, the region R2 in the forward view is estimated to be a region in which the light from the headlight unit of the oncoming vehicle is emitted onto the road surface. Such a region R2 can be specified from the information regarding the road shape acquired from the navigation device 70, as well as the information regarding the location and the advancement direction of the own vehicle K1.

In an environment where such information on the road shape cannot be acquired, the endpoint of the curve or the point at which the curved road region departs from the forward view can be used as a reference point. Specifically, using such a point as a reference, the region R2 can be defined to be a road region from the reference point to a point that is away from the reference point by a predetermined distance along the road (or a point of a predetermined angle along the curve).

When the measurement value M2 is calculated of the brightness of the road surface in the region R2, the control apparatus 60 allows the process to proceed to S160.

When the guardrail 80 is determined to be built up at S140, the control apparatus 60 allows the process to proceed to S150. At S150, measurement is made of the brightness of a side surface of the guardrail 80 in a specified region R3.

Figure 7:
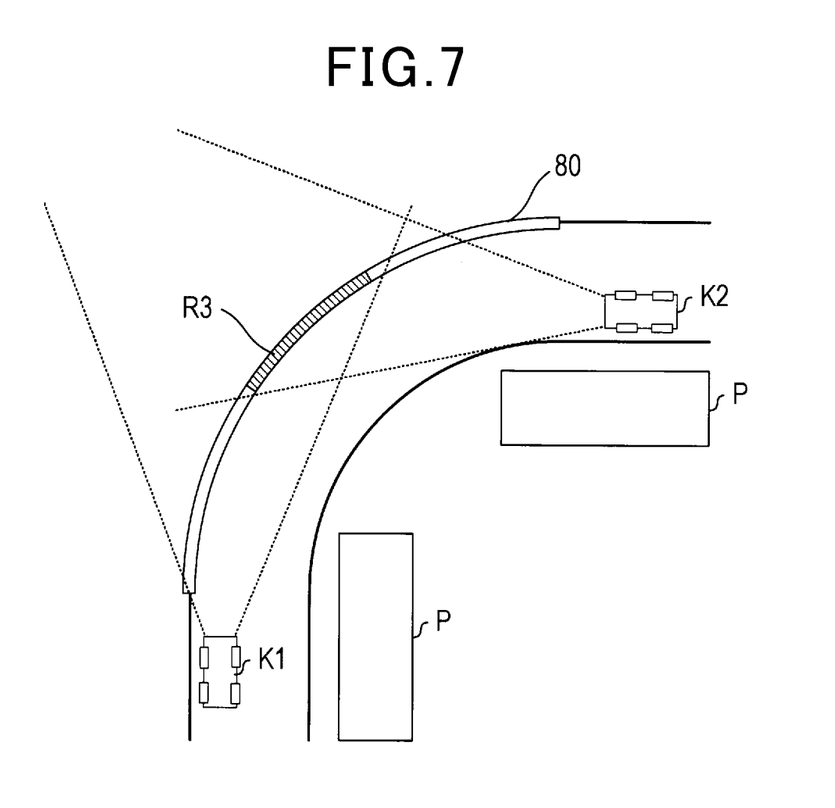
FIG. 7 is a diagram illustrating an example of a region where brightness is measured, when there is a curve ahead of the vehicle with a guardrail being provided.

For example, at S150, similar to the processing at S135 and S145, the luminance sensor 50 is permitted to detect a luminance at each of points in a region ahead of the own vehicle. Then, of the luminance detection values of the respective points, a group of luminance detection values of designated points corresponding to the side surface of the guardrail in the region R3 is extracted and stored as a measurement value M3 for the brightness of the side surface of the guardrail in the region R3.

As another example, the side surface of the guardrail in the region R3 may be divided into a plurality of blocks, for each of which a total value (e.g., average, median, sum or maximum) of the luminance detection values is calculated. Then, a group of total values of the blocks may be stored as the measurement value M3 of the brightness of the side surface of the guardrail in the region R3.

The hatched area of FIG. 7 indicates an example of the region R3 for which the brightness of the side surface of the guardrail is measured. The region R3 may be defined based on an idea similar to the region R2. Specifically, a road region that can be determined to be the region R3 corresponds to a region in the side surface of the guardrail 80 which is estimated to receive emission of light from the headlight unit of an oncoming vehicle. In this case, the oncoming vehicle is present ahead of the curved road region residing in the forward direction of the own vehicle and provided with the guardrail 80.

For example, the region R3 can be determined to be a region in the guardrail 80 provided along the region R2. After calculating the measurement value M3 of the brightness in the region R3 of the side surface of the guardrail, the control apparatus allows the process to proceed to S160.

At S160, the control apparatus 60 calculates a variation $\Delta$ from a previous measurement value M0 of the measurement value M1, M2 or M3 of the brightness calculated this time at any of S135, S145 and S150.

However, if the measurement value M1 is calculated at S135 this time, the measurement value M1 previously calculated at S135 is used as the previous measurement value M0 to calculate the variation $\Delta=M1-M0$. In other words, when a measurement value Mi (i=1, 2 or 3) is calculated this time, the measurement value Mi (i=1, 2 or 3) previously calculated at the same step is used as the previous measurement value M0 to calculate the variation $\Delta=Mi-M0$.

If there is no corresponding previous measurement value M0 (e.g., if a different measurement value M1, M2 or M3 is calculated at a different step in the previous light distribution control process), the previous measurement value M0 is taken to be the same as the measurement value Mi this time to thereby calculate the variation $\Delta=M1-M0$.

Additionally, according to the example described above, the measurement value M1, M2 or M3 includes the luminance detection values at the respective points. In this case, the variation $\Delta$ is calculated for each point as a variation $\delta$ of the luminance detection value of this time, from the previous luminance detection value. In other words, the variation $\Delta$ is composed of a group of variations $\delta$ at the respective points. With the movement of the own vehicle K1, if there is no previous luminance detection value of the same point, the variation $\delta$ at the point may be taken to be zero.

According to another example described above, the measurement value M1, M2 or M3 includes total values of the respective blocks. In this case, the variation $\Delta$ is calculated, on a block basis, as a variation $\delta$ of the total value of this time, from the previous total value. In other words, the variation $\Delta$ in this case is composed of a group of variations $\delta$ of the blocks. With the movement of the own vehicle K1, if there is no previous total value of the same block, the variation $\delta$ of the block may be taken to be zero.

After calculating the variation $\Delta$ in this way, the control apparatus 60 allows the process to proceed to S170. At S170, the control apparatus 60 determines whether or not the calculated variation $\Delta$ is equal to or larger than a threshold TH. If N (e.g., one) or more variations $\delta$ are equal to or larger than the threshold TH, among the variations $\delta$ of the points or blocks included in the variation $\Delta$, an affirmative determination may be made and, otherwise, a negative determination may be made.

Then, when an affirmative determination is made (Yes at S170), the control apparatus 60 allows the process to proceed to S180 where the control apparatus 60 predicts that another vehicle will emerge in the forward view, while predicting the area of emergence.

The reason why the determination at S170 leads to the prediction of whether or not another vehicle will emerge in the forward view is as follows. Specifically, this is because, as shown in FIGS. 5, 6 and 7, the measurement value M1, M2 or M3 includes the information on the light emitted from the headlight unit of the forward vehicle K2 that is yet to emerge in the forward view due to the presence of an obstacle P or a road curve. The dotted lines indicated in FIGS. 5, 6 and 7 each schematically show the illumination ranges of the light from the own vehicle K1 and the forward vehicle K2.

When the light from the forward vehicle K2 is emitted onto the road surface of the region R1 or R2, or the side surface of the guardrail in the region R3, the measurement value M1, M2 or M3 varies with the movement of the forward vehicle K2. Considering a road environment in general, when the measurement value M1, M2 or M3 varies by not less than a predetermined amount, there is a high probability that a vehicle having a high-intensity light source is moving toward the region R1, R2 or R3.

In this regard, in the present embodiment, whether a vehicle emerges in the forward view is predicted by determining whether or not the variation $\Delta$ is equal to or more than the threshold TH. When the measurement value M1, M2 or M3 has a small proportion of luminance components of the illumination from the headlight unit 10 of the own vehicle K1, a fixed value, for example, can be used as the threshold TH. The fixed value, which only has to be a value that can ensure prediction accuracy to some extent, can be calculated by conducting tests or the like.

However, there may be a situation where the measurement value M1, M2 or M3 includes luminance components of the illumination from the headlight unit 10 of the own vehicle K1 to some extent and the luminance components cannot be ignored. In such a situation as well, the threshold TH as a fixed value may be used to determine whether the variation $\Delta$ is equal to or more than the threshold TH. However, the determination based on the fixed value in this situation may result in an erroneous prediction of the forward vehicle K2 as emerging, because the variation $\Delta$ (variations $\delta$) increases with the movement of the own vehicle K2. In other words, when the threshold TH is a fixed value, there is a probability that high prediction accuracy is not achieved.

To cope with this, the threshold TH may be determined to be a value (C+A) which is obtained by adding an increase A in the variation $\Delta$ (variations $\delta$) of the illumination from the headlight unit 10 of the own vehicle K1 to a reference value C. The value A can be calculated from a speed of the own vehicle K1, or a positional relationship of the own vehicle K1 with the region R1, R2 or R3 corresponding to the measurement value M1, M2 or M3, respectively. For example, when the own vehicle K1 is in a stopped state, the threshold TH can be set by taking the increase A to be zero.

The same threshold TH may be used for each of the points (or blocks), or the threshold TH may be different on a point (or block) basis. The reference value C may be determined taking account such as of the material of the road or the side surface of the guardrail, or the legal speed allowed on the road.

At S180, an emergence area is predicted. The emergence area can be predicted as follows, for example, depending on the presence/absence or the direction of the curve.

Figure 8:
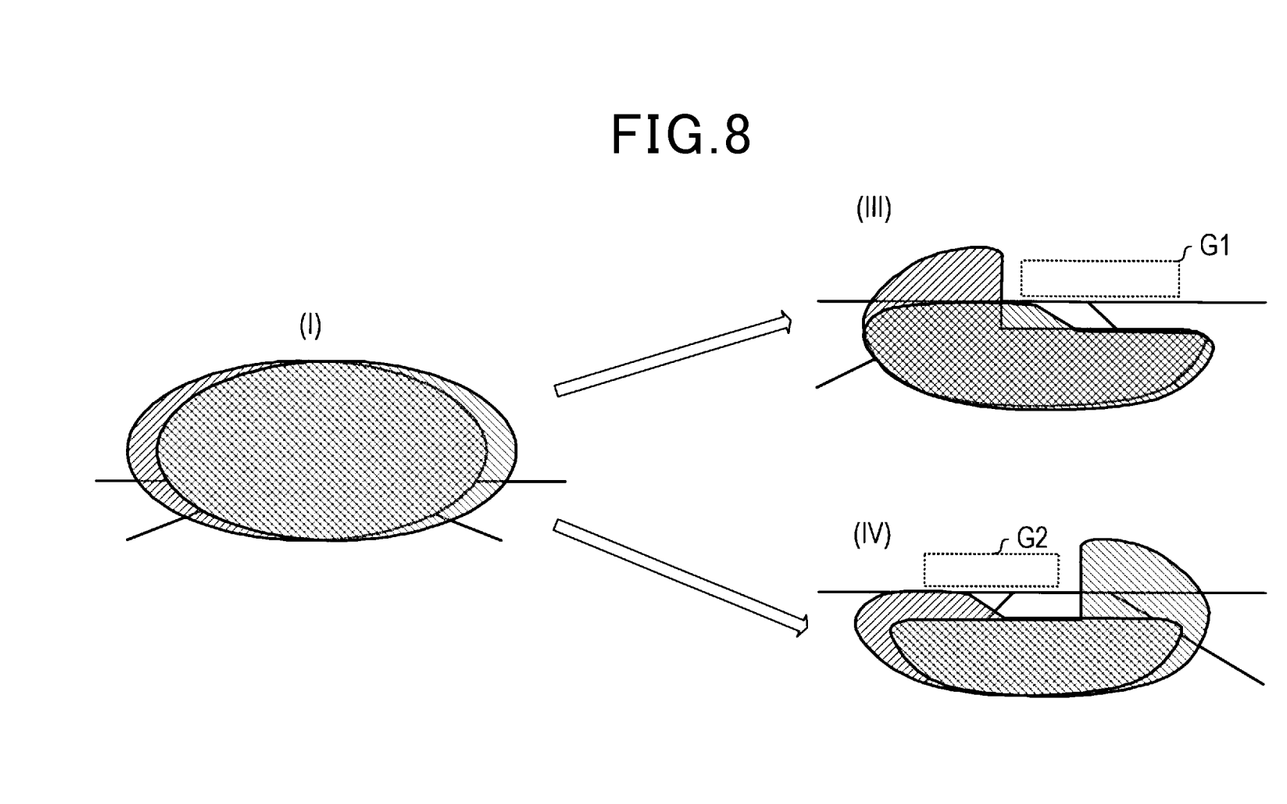
FIG. 8 is a diagram illustrating switching of lighting modes in conformity with an emergence prediction results for forward vehicle.

For example, if an affirmative determination is made at S130 and the road region in the forward view is curved to the right, an upper part covering the center and right sections of the region ahead of the own vehicle, as shown in FIG. 8, can be predicted as an emergence area G1 where the forward vehicle K2 may emerge.

When the road region in the forward view is curved to the left, an upper part covering the center and left sections of the region ahead of the own vehicle can be predicted as an emergence area G2 where the forward vehicle K2 may emerge. If a negative determination is made at S130, an upper part covering the left, center and right sections of the region ahead of the own vehicle can be predicted as an emergence area G3 where the forward vehicle K2 may emerge.

After predicting the area G1, G2 or G3 at S180, the control apparatus 60 allows the process to proceed to S185. At S185, the control apparatus 60 again selects a lighting mode that darkens the predicted emergence area G1, G2 or G3, as a lighting mode to be set. In other words, the lighting mode to be set that has been selected at S110 is switched to a lighting mode with which light is not emitted to the emergence area G1, G2 or G3.

In the case where the process proceeds to S185, the lighting mode selected at S110 is not a low-beam mode. Accordingly, with the lighting mode selected at S110, light is emitted at a large angle in at least one of the left, center and right sections.

At S185, if the emergence area G1, G2 or G3 is included in the above sections in which light is emitted at a large angle by the lighting mode selected at S110, the lighting mode is switched to another mode with which light is emitted at a small angle in these sections. There may be some sections to which light is emitted at a large angle by the selection of lighting mode made at S110, but which do not correspond to the emergence area G1, G2 or G3. For such sections, a lighting mode can be selected such that light is emitted at a large angle.

After completing the processing at S185, the control apparatus 60 allows the process to proceed to S190. At S190, the control apparatus 60 compares the lighting mode currently set to the headlight unit 10 with the lighting mode to be set selected at S185 to determine whether or not the lighting mode of the headlight unit 10 is required to be switched to another mode.

If it is determined that the lighting mode is required to be switched to another mode (Yes at S190), control proceeds to S195. At S195, the control apparatus 60 controls the headlight unit 10 so as to operate in the lighting mode to be set selected at S185. After that, the light distribution control process is halted. The control apparatus 60 repeatedly performs the light distribution control process of which the details have been described above.

The control system 1 of the present embodiment described above is operated in the case where, for example, the present lighting mode is the first lighting mode (high-beam mode) and the forward vehicle K2 (oncoming vehicle) emerges from a region ahead of a road region curved to the right. In this case, as shown in FIG. 8, the lighting mode of the headlight unit 10 is switched, prior to the emergence of the forward vehicle K2, from the first lighting mode to the third lighting mode with which light is not emitted to the area G1 where the forward vehicle K2 will emerge (S195). The arrow drawn from sign (I) toward sign (III) in FIG. 8 indicates the switching from the first lighting mode to the third lighting mode.

Further, the control system 1 is operated in the case where the forward vehicle K2 (oncoming vehicle) emerges in the forward view from a region ahead of the road region curved to the left. In this case, based on an emergence prediction conducted prior to the emergence, the lighting mode of the headlight unit 10 is switched to the fourth lighting mode with which light is not emitted to the area G2 where the vehicle will emerge. The arrow drawn from sign (I) toward sign (IV) in FIG. 8 indicates the switching from the first lighting mode to the fourth lighting mode.

Figure 9:
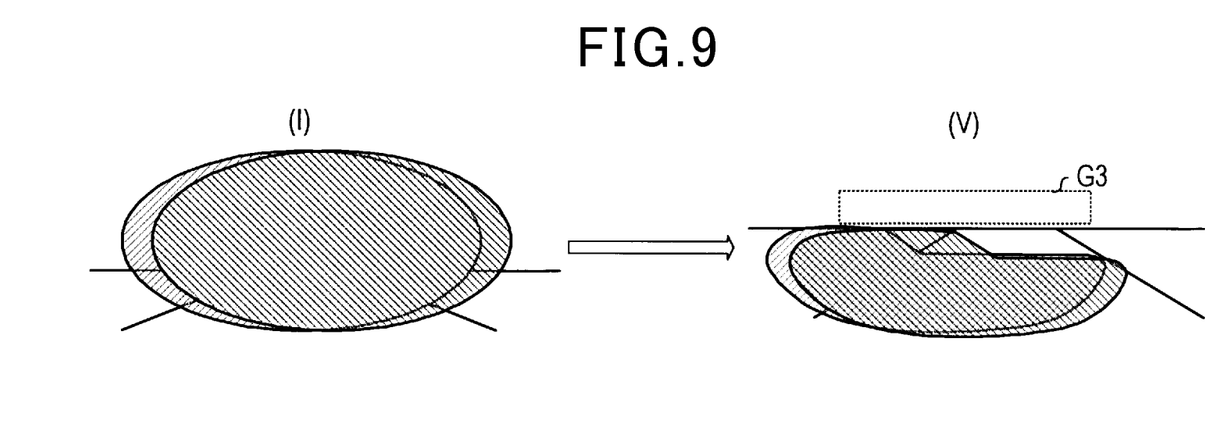
FIG. 9 is a diagram illustrating switching of lighting modes in conformity with an emergence prediction results for forward vehicle.

Further, the control system 1 is operated in the case where the forward vehicle K2 enters from a roadside into the road where the own vehicle K1 travels and the forward vehicle is not present in the forward view due to the presence of the obstacle P. In this case, an emergence prediction is conducted prior to the emergence to thereby switch the lighting mode of the headlight unit 10 from the first lighting mode to the fifth lighting mode (low-beam mode) with which light is not emitted to the area G3 where the forward vehicle K2 will emerge (S195). The arrow drawn from sign (I) toward sign (V) in FIG. 9 indicates the switching from the first lighting mode to the fifth lighting mode.

Accordingly, the control system 1 of the present embodiment is able to appropriately control the light emitted from the headlight unit 10 to prevent an occupant of another vehicle from being dazzled by the glare of the headlight unit. According to the conventional techniques, the lighting mode is switched to another mode to prevent dazzling of another vehicle's occupant after emergence of the vehicle in the forward view. With the conventional techniques, the occupant of another vehicle that has already emerged is dazzled in a period before the switching is completed. In this regard, according to the present embodiment, the lighting mode can be switched to another mode more promptly than in the conventional art under the same conditions. Since the lighting mode can be switched to an appropriate lighting mode prior to the emergence of a vehicle, an occupant of the forward vehicle K2 that has suddenly emerged can be prevented from being dazzled.

The present invention should not be construed as being limited to the foregoing embodiment but may be variously modified. For example, the measurement value M1, M2 or M3 of the foregoing embodiment is configured by a group of luminance detection values of respective points or a group of total values of the blocks. Alternatively, the measurement value M1, M2 or M3 may be a single total value (e.g., average of luminance detection values) corresponding to a group of luminance detection values of a corresponding one of the regions R1, R2 and R3. In this case, when the region R1, R2 or R3 corresponding to the previous measurement value M0 is offset from the region R1, R2 or R3 corresponding the measurement value M1, M2 or M3 this time, these region are taken as being identical to thereby calculate the variation Δ.

According to the foregoing embodiment, the luminance sensor 50 is used to detect luminance of each point in a region ahead of the own vehicle. Alternatively, the luminance at each point in a region ahead of the own vehicle may be specified from an image captured by the camera 30. Accordingly, at S135, S145 and S150, the image captured by the camera 30 may be analyzed to thereby detect the luminance at each point.

The light distribution control process shown in FIGS. 3 and 4 may be configured as a process for correcting a lighting mode instructed by the driver, to a lighting mode with which an occupant of the forward vehicle K2 emerging in the forward view is not dazzled. In this case, the processing at S110 can be configured as a processing for selecting and setting a lighting mode instructed by the driver via the input unit 20 as the lighting mode to be set.

The foregoing embodiment uses a technique for switching the lighting mode to another mode so that light is not emitted to the emergence area G1, G2 or G3. Alternative to this, so-called light modulation may be conducted to weaken the intensity of the light emitted to the emergence area G1, G2 or G3, thereby ensuring the vehicle occupant to be prevented from being dazzled. When conducting light modulation, the technique of reducing intensity can be used not only for the emergence area G1, G2 or G3, but also for the entire area over which light is emitted with the lighting mode.

Finally, correspondency is explained. The function realized by the processing at S135, S145 and S150 executed by the luminance sensor 50 and the control apparatus 60 corresponds an example of the function realized by the measuring means.

The function realized by the processing at S160, S170 and S180 executed by the control apparatus 60 corresponds to an example of the function realized by the predicting means. The function realized by the processing at S180, S190 and S195 executed by the control apparatus 60 corresponds to an example of the function realized by the control means. The function realized by the processing at S130 and S140 executed by the control apparatus 60 corresponds to an example of the function realized by the curve determining means.

REFERENCE SIGNS LIST

1 . . . Control system, 10 . . . Headlight unit, 20 . . . Input unit, 30 . . . Camera, 40 . . . Radar unit, 50 . . . Luminance sensor, 60 . . . Control apparatus, 61 . . . CPU, 63 . . . ROM, 65 . . . RAM, 70 . . . Navigation device, 80 . . . Guardrail, G1, G2, G3 . . . Emergence area, K1 . . . Own vehicle, K2 . . . Forward vehicle, P . . . Obstacle, R1, R2, R3 . . . Region

The invention claimed is:

1. A headlight control apparatus that controls a headlight unit mounted to a vehicle, comprising:
   a measuring means for measuring brightness ahead of the vehicle;
   a predicting means for predicting whether or not another vehicle emerges ahead of the vehicle, on the basis of a variation in the brightness of a specified region ahead of the vehicle measured by the measuring means;
   a control means for controlling emission of light from the headlight unit so as to darken an area where the another vehicle emerges, when the predicting means predicts emergence of the another vehicle; and
   a curve determining means for determining whether or not a curved road region is present ahead of the vehicle,
   wherein the curve determining means includes a means for further determining whether or not a guardrail is present along the curved road region; and
   the predicting means predicts whether or not the another vehicle emerges, on the basis of the variation in the brightness measured by the measuring means for the guardrail provided along the curved road region as the specified region, when the curved road region is determined to be present and the guardrail is determined to be present.

2. The headlight control apparatus according to claim 1, wherein the predicting means predicts whether or not the another vehicle emerges, on the basis of the variation in the brightness measured by the measuring means for a road surface of the curved road region as the specified region, when the curved road region is determined to be present and the guardrail is determined not to be present.

3. The headlight control apparatus according to claim 2, wherein the predicting means predicts whether or not the another vehicle emerges, on the basis of the variation in the brightness measured by the measuring means for a road surface ahead of the vehicle as the specified region, when the curve determining means determines that the curved road region is not present.

4. The headlight control apparatus according to claim 2, wherein:
   the apparatus comprises a determining means for determining whether or not the variation in the brightness of the specified region measured by the measuring means has exceeded a threshold; and
   the another vehicle is predicted to emerge when the determining means determines that the variation in the brightness in the specified region has exceeded the threshold.

5. The headlight control apparatus according to claim 1, wherein the predicting means predicts whether or not the another vehicle emerges, on the basis of the variation in the brightness measured by the measuring means for a road surface ahead of the vehicle as the specified region, when the curve determining means determines that the curved road region is not present.

6. The headlight control apparatus according to claim 5, wherein:
   the apparatus comprises a determining means for determining whether or not the variation in the brightness of the specified region measured by the measuring means has exceeded a threshold; and
   the another vehicle is predicted to emerge when the determining means determines that the variation in the brightness in the specified region has exceeded the threshold.

7. The headlight control apparatus according to claim 1, wherein:
   the apparatus comprises a determining means for determining whether or not the variation in the brightness of the specified region measured by the measuring means has exceeded a threshold; and
   the another vehicle is predicted to emerge when the determining means determines that the variation in the brightness in the specified region has exceeded the threshold.

8. A method for controlling a headlight unit mounted to a vehicle, comprising steps of:
   measuring brightness ahead of the vehicle;
   predicting whether or not another vehicle emerges ahead of the vehicle, on the basis of a variation in the measured brightness of a specified region ahead of the vehicle; and
   controlling emission of light from the headlight unit so that an area where the another vehicle emerges is darkened, when the another vehicle is predicted to emerge by the prediction; and
   determining whether or not a curved road region is present ahead of the vehicle,
   wherein the curve determining step includes a step for further determining whether or not a guardrail is present along the curved road region; and the predicting step predicts whether or not the another vehicle emerges, on the basis of the variation in the brightness measured by the measuring means for the guardrail provided along the curved road region as the specified region, when the curved road region is determined to be present and the guardrail is determined to be present.

9. The method for controlling a headlight unit mounted to a vehicle according to claim 8, wherein predicting whether or not the another vehicle emerges is predicted on the basis of the variation in the brightness measured for a road surface of the curved road region as the specified region, when the curved road region is determined to be present and the guardrail is determined not to be present.

10. The method for controlling a headlight unit mounted to a vehicle according to claim 9, wherein predicting whether or not the another vehicle emerges is predicted on the basis of the variation in the brightness measured for a road surface ahead of the vehicle as the specified region, when determining that the curved road region is not present.

11. The method for controlling a headlight unit mounted to a vehicle according to claim 9, further comprising:
    determining whether or not the variation in the brightness of the specified region measured has exceeded a threshold; and
    predicting whether or not another vehicle emerges when the variation in the brightness in the specified region has exceeded the threshold.

12. The method for controlling a headlight unit mounted to a vehicle according to claim 8, wherein predicting whether or not the another vehicle emerges is predicted on the basis of the variation in the brightness measured for a road surface ahead of the vehicle as the specified region, when determining that the curved road region is not present.

13. The method for controlling a headlight unit mounted to a vehicle according to claim 12, wherein predicting whether or not the another vehicle emerges is predicted on the basis of the variation in the brightness measured for a road surface ahead of the vehicle as the specified region, when determining that the curved road region is not present.

14. The method for controlling a headlight unit mounted to a vehicle according to claim 12, further comprising:
    determining whether or not the variation in the brightness of the specified region measured has exceeded a threshold; and
    predicting whether or not another vehicle emerges when the variation in the brightness in the specified region has exceeded the threshold.

15. The method for controlling a headlight unit mounted to a vehicle according to claim 12, wherein predicting whether or not the another vehicle emerges is predicted on the basis of the variation in the brightness measured for a road surface ahead of the vehicle as the specified region, when determining that the curved road region is not present.

16. The method for controlling a headlight unit mounted to a vehicle according to claim 8, further comprising:
    determining whether or not the variation in the brightness of the specified region has exceeded a threshold; and
    predicting whether or not another vehicle emerges when the variation in the brightness in the specified region has exceeded the threshold.

* * * * *

UNITED STATES PATENT AND TRADEMARK OFFICE
CERTIFICATE OF CORRECTION

| | |
|---|---|
| PATENT NO. | : 9,527,433 B2 |
| APPLICATION NO. | : 14/775596 |
| DATED | : December 27, 2016 |
| INVENTOR(S) | : Koji Imaeda et al. |

Page 1 of 1

It is certified that error appears in the above-identified patent and that said Letters Patent is hereby corrected as shown below:

In the Specification

In Column 5 at Lines 23-28, Change "The ROM 63 stores the program, while the RAM 65 is used as a work area where the process is executed by the CPU 61. The following description sets force the process executed by the CPU 61 according to the program. In the following description, the control apparatus 60 is the subject of operation." and insert the same on Column 5, Line 22, as a continuation of the same paragraph.

In the Claims

In Column 15 at Lines 3-4, In Claim 8, change "by the measuring means for the guardrail" to --of the guardrail--.

In Column 16 at Line 19, In Claim 15, change "12," to --14,--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*